United States Patent [19]

Häyhä

[11] Patent Number: 4,756,896

[45] Date of Patent: Jul. 12, 1988

[54] METHOD OF PREPARING SILICON

[75] Inventor: Aarno Häyhä, Helsinki, Finland

[73] Assignee: Kemira Oy, Helsinki, Finland

[21] Appl. No.: 45,788

[22] Filed: Apr. 27, 1987

Related U.S. Application Data

[63] Continuation of Ser. No. 832,101, Feb. 20, 1986, abandoned.

[30] Foreign Application Priority Data

Mar. 11, 1985 [FI] Finland .................................. 850951

[51] Int. Cl.$^4$ ............................................. C01B 33/02
[52] U.S. Cl. ..................................... 423/350; 423/349
[58] Field of Search ........................................... 423/348

[56] References Cited

U.S. PATENT DOCUMENTS

| | | | |
|---|---|---|---|
| 2,791,499 | 5/1957 | Clegg et al. | 75/84.5 |
| 2,898,195 | 5/1956 | Banus et al. | 423/646 |
| 4,442,082 | 4/1984 | Sanjurjo | 423/350 |
| 4,584,181 | 4/1986 | Nanis | 423/350 |

OTHER PUBLICATIONS

In re Migrdichian, 54 USPQ190.

*Primary Examiner*—John Doll
*Assistant Examiner*—Lori S. Freeman
*Attorney, Agent, or Firm*—Pennie & Edmonds

[57] ABSTRACT

The invention relates to a method for preparing polycrystalline pure silicon by reducing gaseous silicon tetrafluoride at a raised temperature by means of alkali metal or alkali earth and by recovering the silicon by means of liquid phase separation. According to the invention, the gaseous silicon tetrafluoride is reduced by fused alkali metal or alkali earth or powder dispersed into a liquid intermediate agent boiling at a high temperature.

19 Claims, No Drawings

METHOD OF PREPARING SILICON

This is a continuation of application Ser. No. 832,101, filed Feb. 20, 1986, now abandoned.

This invention relates to a method for preparing pure silicon. This invention particularly relates to a continuous method by which gaseous silicon tetrafluoride is reduced at a raised temperature by means of alkali metal and alkali earth, dispersed into an intermediate liquid agent after which the silicon is recovered e.g. by means of a liquid phase separation or by dissolving the produced alkali or alkali earth fluoride.

BACKGROUND ART

Silicon is the main raw material of semiconductor industry, and it is estimated that the use of it will increase considerably in the production of electricity based on the solar radiation energy, provided that the production costs of silicon are substantially reduced from the cost level of present methods.

Silicon is industrially produced by reducing arenaceous quartz by carbon at a high temperature (DE patent application No. 30 232 97.4). The metallurgic silicon thus obtained is further purified by a treatment with hydrogen chloride gas, whereby various compounds of silicon, hydrogen and chloride arise, as for instance trichlorosilane and under certain circumstances also silane. The desired compounds are separated by distillation at a high temperature, e.g. the trichlorosilane is dissolved by hydrogen into silicon and hydrogen chloride. The disadvantage of this method is a high energy consumption and a low yield.

U.S. Pat. No. 2,172,969 discloses a method of reducing sodium silicon fluoride by sodium at a temperature of appr. 500° C., the result of the reaction being an amorphous powder containing silicon and sodium fluoride. By treating the product thus obtained with sulphuric acid the silicon is separated, whereby the sodium fluoride reacts, constituting hydrogen fluoride and a solution of sodium sulphate. The purity of the silicon by this method is 96-97% and the yield approximately 87% of the theoretical yield.

A method of preparing silicon by reducing silicon tetrachloride or fluoride by sodium is also known. The basic reaction $SiF_4 + 4Na \rightarrow Si + 4NaF$ has indeed been known for a very long time (Hempel et al. Zanorg. Chem. 23, 1900, 32/42). In the patented methods, the raw materials are purified by conducting them in the vapour phase through finely pulverized quartz and finely pulverized silicon (U.S. Pat. No. 3,041,145) or the silicon and the sodium fluoride are separated from each other by liquid phase separation by maintaining a temperature at the reactor bottom, which is above the fusion point of silicon (U.S. Pat. No. 4,442,082).

All the cited methods are characterized by that the reactions take place in the vapour phase and at a high temperature (probably more than 600° C.), which e.g. means correspondingly high material costs, and the process is difficult to carry out as continuous action.

SUMMARY OF THE INVENTION

The purpose of this invention is to achieve a continuous process for preparing pure silicon, using relatively low temperatures and using the reaction between gaseous silicon tetrafluoride, which is abundantly produced in phosphoric acid industry, and alkali metal or alkali earth metal. The invention is based on the discovery, that the reaction $(SiF_4 + 4Na \rightarrow Si + 4NaF)$ not only works in high temperatures as in the previous art, but it works well also in the relatively low temperature region, such as between about 300° C. and 350° C., and in liquid intermediate agents. In consequence, the process is easy to carry out as continuous action, because the raw materials and reaction products are in an easily circulating form (circulating with the liquid intermediate agent), with the flow rates and the temperature being easy and simple to regulate. Further, the standard type of the reactors with inexpensive raw materials could be used because of such relatively low temperatures.

The main characteristics of the invention are disclosed in the annexed claim 1.

DETAILED DESCRIPTION OF THE INVENTION

Differing from prior known methods for preparing silicon the gaseous silicon tetrafluoride is now reduced by a fused alkali metal or alkali earth or powder dispersed into an intermediate agent boiling at a high temperature, and not in the vapour phase as before.

The utilization of an oil boiling at a high temperature in the reaction of metallic sodium is in fact prior known per se e.g. from U.S. Pat. No. 2,898,195 and GB patent specification No. 1,216,395, disclosing methods for preparing sodium hydride, as well as from U.S. Pat. No. 2,791,499 for the preparation of metallic titanium and other corresponding refractory metals. By the method of U.S. Pat. No. 2,898,195 sodium is made to react into sodium hydride by feeding liquid sodium and inert liquid boiling at a high temperature through the reaction series and agitating them strongly simultaneously in the presence of hydrogen at a high pressure. U.S. Pat. No. 2,791,499 analogously deals with the reactions of various salts of the so-called refractory metals of the groups IV B, V B and VI B, of which the fusing point has been defined to at least 1700° C., with sodium dispersed into kerosene, at a temperature not exceeding 150°–200° C. The sole example describes the reduction of titanium tetrachloride into titanium metal by adding liquid titanium tetrachloride to sodium dispersed in kerosene within 30 minutes. The mixture was allowed to stand for 25 minutes and the reaction products were then removed. U.S. Pat. Nos. 4,374,111 and 4,407,783 further disclose methods for preparing silane from sodium hydride and silicon tetrafluoride by using ethers and hydrogen carbons as suspending intermediate agents, whereby these intermediate agents however participate in the reaction and thus affect the final result of the reaction.

The preparation of silicon in a liuqid intermediate agent either continuously or discontinuously was, however, not previously known. It was not previously, before, the present research work carried out, self-evident that the process would work in or that silicon would form at such low temperature, i.e., whether it would be kinetically possible to achieve the desired product in sufficient yields. A liquid intermediate agent boiling at a high temperature is however not previously known.

The high temperature favours the reduction of the gaseous silicon tetrafluoride into silicon and alkali or alkali earth fluoride. However, it has been demonstrated that, against prejudices based on some literature data, the process worked well and easily when reduction temperatures of at least 300° C. and below about 350° C. were used. The reduction temperatures must also be below the decay or decomposition temperature of the liquid intermediate agent.

In order to break the solid reaction product layer growing around sodium, drops in a liquid intermediate agent boiling at a high temperature and to denude fresh reactive surface a mechanical blender having a high cutting speed is preferably used. The rotation speed of the blender is preferably 1000–3000 rotations/minute.

As liquid intermediate agent boiling at a high temperature an inert organic oil is preferably used, into which preferably is dispersed sodium or magnesium or a mixture of both, e.g. an alloy.

The advantageous silicon raw material in accordance with the process of the invention is the silicon fluorhydric acid produced by the preparation of phosphoric acid, for which it has been difficult to find an economical use until now. The silicon can be precipitated from the acid quantitatively as alkali silicon fluoride by using e.g. sodium chloride, sodium fluoride or equivalent potassic salts as precipitant. By this treatment, the impurities in the acid remain essentially in the solution phase. The sodium silicon fluoride can be thermally dissolved at a temperature above 700° C. into a gaseous silicon tetrafluoride and sodium fluoride according to the following reaction:

$$Na_2SiF_6 \rightarrow 2NaF + SiF_4$$

By thermal diffusion an extremely pure silicon tetrafluoride is obtained, the major portion of the impurities remaining in the sodium fluoride. The gas thus obtained is conducted into the reducing reaction.

The silicon tetrafluoride is reduced by the process according to the invention by a sodium dispersed into the oily intermediate agent according to the following reaction equation:

$$SiF_4(g) + 4Na \text{ oil} \rightarrow Si(s) + 4NaF(s) \text{ oil}$$

The reactivity of the sodium drops present in the oil is maintained by strongly agitating the dispersion, whereby the high cutting speed of the agitating member continuously breaks the solid reaction product layer growing around the sodium and denudes fresh reactive surface. The reaction temperature is determined by the heat resistance of the oil to be used, a high temperature then improves the kinetic conditions of the reaction. The sodium fluoride formed may react further with silicon tetrafluoride, producing sodium silicon tetrafluoride:

$$2NaF(s) + SiF_4(g) \rightarrow Na_2SiF_6(s)$$

This reaction is an inverse reaction of the thermal diffusion of sodium silicon fluoride and as such not desired, as it consumes the other raw material. It does not however use sodium, which from the economical point of view of the process is a far more critical raw material. The relative importance of this competing reaction decreases as the temperature rises.

The product to be obtained in the reducing reaction is a brown, finely pulverized powder composed by amorphous silicon suspended in oil, sodium fluoride and sodium silicon fluoride. The oil can be filtered from the solid material and returned to the reduction reactor. The silicon can be recovered by heating the product above the fusion point of silicon, whereby the oil remaining in the product is evaporated and the sodium silicon fluoride is dissolved into sodium fluoride. The sodium fluoride and the silicon are separated as liquid phases from each other owing to the difference between the specific weight and the surface tension. Alternatively, sodium fluoride thus produced can be separated from the silicon by aqueous leaching.

EXAMPLES

The following examples illustrate the effect of different variables on the reaction degree and the product composition. An autoclave has been used as reaction vessel in the examples, however, this is not necessary, as a nearly normal atmosphere can be obtained by optimizing the gas feeding in the conditions.

EXAMPLE 1

A 2 l autoclave was charged with 100 g sodium and 720 g highly boiling mineral oil ("Primol" 352, manufacturer ESSO, a very pure paraffine oil, the flashing point of which is 252° C.). The autoclave was closed and heated first to 120° C. in order to melt the sodium and then to the reduction temperature 300° C. Sodium was dispersed into the oil by a turbine blender, the rotation speed of which was 3000 rotations/minute. Silicon tetrafluoride was fed from a gas reservoir at a rate of 2.0 g/min. Intermediate samples were taken from the reactor during the operation through a sampling tube equipped with a tap. The quantity of the intermediate sample was 5–20 g. When the operation was finished, the autoclave was opened, and a sample was taken from the final product for analysis.

The samples were treated as follows in order to calculate the proportion of the different components and the conversion determined for the remaining metallic sodium:

The product was separated from the oil by decanting, and the oil was cleaned from deposits with dichloromethane. The washed deposit was separated by centrifugation and was elutriated into spectral clean ethanol of 99 weight-% with the ratio 1 portion deposit and 10 portions ethanol. The elutriation period was 30 min. By this process, the metallic sodium present in the sample was made to react in a controlled way into sodium methanol according to the following reaction equation:

$$2Na + 2EtOH \rightarrow 2NaEtO + H_2$$

The slurry was filtered by a büchner funnel, and the sodium in the solution was determined by atomic absorption. The slurry was dried in an argon protective gas at 70° C. According to the Sedigraph grain size analysis of the dry slurry, the $d_{50}$ diameter of the grains was 6.2 μm. The x-ray diffraction showed a clear peak at the sodium fluoride and the sodium silicon fluoride, but not at the silicon, which indicates that silicon arises as non-crystalline.

A portion of dried slurry was weighed and elutriated in water with the ratio 1 portion solid agent and 10 portions water in order to dissolve the water-soluble salts NaF and $Na_2SiF_6$. The elutriation period was 30 min. The slurry was filtered with a büchner funnel, and the fluoride concentration was measured in the filtrate by an ion-selective electrode. The deposit was reelutriated, until the fluoride concentration of the filtrate was below 3 mg/l. The filtrates were combined, and in the solution obtained the sodium and the fluorine were analysed. The proportion of sodium fluoride and sodium silicon fluoride in the product was calculated by Na- and F analysis.

The silicon deposit remaining undissolved in the water slurry was dried at 105° C. and was annealed including its filter papers to 900° C. in order to oxidize the silicon into silicon dioxide. The amount of metallic silicon in the sample was obtained by calculating by the weight of the annealed $SiO_2$ deposit.

The compositions of the products and the conversion with regard to sodium calculated by analysis are presented in chart 1.

CHART 1

| Period Min. | $SiF_4$ g | feed- ing % of theo- retical | Product composition | | | | Con- version regard- ing Na % |
|---|---|---|---|---|---|---|---|
| | | | Metall. Na, % | Metall. Si, % | NaF % | $Na_2SiF_6$ % | |
| 50 | 101.4 | 89.7 | 29.5 | 7.4 | 34.2 | 22.4 | 40.5 |
| 70 | 142.8 | 126 | 20.2 | 8.4 | 37.0 | 30.1 | 51.3 |
| 74 | 149.7 | 133 | 11.8 | 8.8 | 35.9 | 37.5 | 72.7 |

The total of the component concentrations presented in the chart varies from 92.4% to 95.7%. The remainder of the product is oxygen adsorbed into the surface of the finely pulverized amorphous powder (see oxygen analysis in examples 3 and 4).

EXAMPLE 2

A test according to example 1 was repeated by raising the reduction temperature to 350° C. The product was treated in the same way as in example 1. The $d_{50}$ diameter of the grains of the dry product obtained after the dichloromethane and ethanol elutriation was 3.9 μm. The NaF and $Na_2SiF_6$ were determined in the product by x-ray diffraction. The composition and sodium conversion calculated by analysis are presented in chart 2.

CHART 2

| Period min. | $SiF_4$ g | feed- ing % of theo- retical | Product composition | | | | Con- version regard- ing Na % |
|---|---|---|---|---|---|---|---|
| | | | Metall. Na, % | Metall. Si, % | NaF % | $Na_2SiF_6$ % | |
| 30 | 57.8 | 51.1 | 32.3 | 7.1 | 34.7 | 17.2 | 49.0 |
| 75 | 146.8 | 130.0 | 8.2 | 8.4 | 34.3 | 36.0 | 81.1 |

By comparing the results of charts 1 and 2 it is noted, that the raising of the temperature improves the conversion of sodium and reduces the proportion of $Na_2SiF_6$, which consumes silicon tetrafluoride.

EXAMPLE 3

The experiment described in example 1 was repeated by changing operation conditions so that the reduction temperature was 350° C., the rotation speed of the agitating member was 2000 rotations/minute and the feeding rate of silicon tetrafluoride was 1.5 g/min. The product was treated as in example 1. The $d_{50}$ diameter of the grains of the dry product obtained by the dichloromethane- and ethanol treatment was 1.8 μm. The oxygen content analysed in the product was 6.2%. The product composition and the conversion of sodium are presented in chart 3.

CHART 3

| Period min. | $SiF_4$ g | feed- ing % of theo- retical | Product composition | | | | Con- version regard- ing Na % |
|---|---|---|---|---|---|---|---|
| | | | Metall. Na, % | Metall. Si, % | NaF % | $Na_2SiF_6$ % | |
| 20 | 42.9 | 36.7 | 42.3 | 6.0 | 36.1 | — | 40.1 |
| 40 | 66.3 | 56.7 | 19.4 | 9.7 | 55.6 | 6.3 | 67.7 |
| 80 | 101.7 | 87.0 | 11.1 | 9.5 | 52.8 | 9.0 | 81.1 |

Chart 3 shows that by using a lower gas feeding rate and blender rotation speed than in the previous examples, the sodium conversion is high and the proportion of sodium silicon fluoride in the product is small.

EXAMPLE 4

The test described in example 1 was carried out at a reduction temperature of 350° C. by using the higher feeding rate of silicon tetrafluoride 8.8 g/min. The samples were treated as in example 1. The oxygen content of the product obtained by the dichloromethane and ethanol treatment was 8.7%. The product composition and sodium conversion appear from chart 4.

CHART 4

| Period min. | $SiF_4$ g | feed- ing % of theo- retical | Product composition | | | | Con- version regard- ing Na % |
|---|---|---|---|---|---|---|---|
| | | | Metall. Na, % | Metall. Si, % | NaF % | $Na_2SiF_6$ % | |
| 5 | 45.8 | 40.5 | 45.9 | 5.1 | 18.9 | 26.4 | 33.5 |
| 10 | 96.5 | 85.4 | 28.7 | 6.9 | 26.6 | 33.3 | 43.5 |
| 17 | 150.1 | 133.0 | 7.8 | 8.2 | 31.1 | 40.9 | 80.4 |

By comparing charts 4 and 2 with each other it is noted that the results of this example and those of example 2 are very similar. The raising of the gas feeding rate from 2 to 8.8 g does not have a great effect on the result.

EXAMPLE 5

A test according to example 1 was carried out by using 350° C. as reduction temperature and raising the rotation speed of the blender to 3500 rotations/min. The samples were treated as in example 1. The conversion of the reaction with regard to sodium appears from chart 5.

CHART 5

| Period min | $SiF_4$ g | feeding % of theo- retical | Metall. Na in the prod. % | Conversion regard. Na % |
|---|---|---|---|---|
| 60 | 92.9 | 82.2 | 8.9 | 82.8 |
| 98 | 150.1 | 133.4 | 6.6 | 83.5 |

The results indicate that the raising of the rotation speed of the blender from 3000 to 3500 rotations/min. does not have any substantial effect on the conversion of sodium. On the other hand, lower rotation speeds do have an effect.

The above experiments have been carried out as batch tests by feeding silicon tetrafluoride into a dispersion of sodium and oil. The charts indicate the product composition by weight-% of the solid material, the remainder having been in oxygen analysis.

What is claimed is:

1. A method for continuously preparing pure silicon by reducing gaseous silicon tetrafluoride at a raised temperature by means of alkali metal or alkali earth and by recovering the silicon, characterized in that the gaseous silicon tetrafluoride is reduced by alkali metal or alkaline earth dispersed into a liquid intermediate agent, the reduction being carried out at a temperature from between at least about 300° C. to about 350° C. but below the decay or decomposition temperature of the liquid intermediate agent.

2. A method according to claim 1, characterized in that a mixture of alkali metal or alkali earth dispersion and gaseous silicon tetrafluoride is mechanically agitated at a rotation speed of about 1000-3000 revolutions per minute.

3. A method according to claim 1, characterized in that gaseous silicon tetrafluoride is bubbled beneath the surface of alkali metal or alkali earth dispersed into a liquid intermediate agent.

4. A method according to claim 1, characterized in that the alkali metal or alkali earth is dispersed into an inert organic oil.

5. A method according to claim 1, characterized in that sodium or magnesium ions or a mixture thereof is dispersed into the liquid intermediate agent.

6. A method according to claim 1, characterized in that silicon fluoride is fed into the alkali metal or alkali earth dispersed into a liquid intermediate agent.

7. A method according to claim 1, characterized in that the solid material obtained as a result of the reduction is separated from the liquid intermediate agent and the separated solid material is heated in order to diffuse the alkali metal or alkali earth silicon halide possibly formed in the reducing reaction and in order to produce a discrete alkali metal or alkali earth halide liquid phase and a silicon liquid phase, which are later separated from each other.

8. A method according to claim 7, characterized in that alkali metal or alkali earth is dispersed into a liquid intermediate agent boiling which has been separated from the solid material, and the dispersion is conducted to reduction.

9. A method according to claim 7, characterized in that the silicon is recovered by liquid phase separation.

10. A method for continuously preparing pure silicon from gaseous silicon tetrafluoride which comprises:
heating a liquid intermediate agent to a temperature of at least about 300° C. but below its decay or decomposition temperature;
dispersing an alkali metal or alkali earth compound into the heated liquid intermediate agent to form a dispersion;
mixing the dispersion with gaseous silicon tetrafluoride to reduce the silicon tetrafluoride to silicon by reaction with the alkali metal or alkali earth compound at a temperature between about 300° C. and 350° C.; and
recovering silicon from the reaction mixture.

11. A method according to claim 10 wherein the gaseous silicon tetrafluoride reactant is prepared by thermally decomposing sodium silicon fluoride.

12. A method according to claim 10 wherein the liquid intermediate agent is an inert organic oil and is heated to its boiling temperature.

13. A method according to claim 10 wherein the reaction mixture is agitated to increase the reduction of silicon tetrafluoride to silicon.

14. A method according to claim 10 wherein the silicon is recovered by separation from the remaining reaction mixture.

15. A method according to claim 10 wherein the alkali metal or alkali earth compound is a sodium halide, a magnesium halide, or mixtures thereof.

16. A method according to claim 10 wherein any solid material produced by the reduction is separated from the reaction mixture and heated to diffuse any alkali metal or alkali earth silicon halides to a discrete alkali metal or alkali earth halide liquid phase and a silicon liquid phase; wherein the liquid silicon phase is recovered by separation from the halide liquid phase.

17. A method for continuously preparing pure silicon which comprises:
thermally decomposing sodium silicon fluoride to sodium fluoride and gaseous silicon tetrafluoride;
heating an organic oil intermediate agent above 300° C. but below a temperature which causes decomposition of the oil; p1 dispersing an alkali metal halide into the oil to form a dispersion;
bubbling the gaseous silicon tetrafluoride through the dispersion with agitation to form a reaction mixture whereby the silicon tetrafluoride is reduced to silicon at a temperature of between about 300° C. and about 350° C.; and
recovering silicon from the reaction mixture.

18. A method according to claim 17 wherein the oil is heated to its boiling temperature and the alkali metal halide is sodium or magnesium fluoride.

19. A method according to claim 17 wherein any solid material produced by the reduction is separated from the reaction mixture and heated to diffuse any alkali metal or alkali earth silicon halides to a discrete alkali metal or alkali earth halide liquid phase and a silicon liquid phase; wherein the liquid silicon phase is recovered by separation from the halide liquid phase.

* * * * *